United States Patent [19]
Kuphal et al.

[11] Patent Number: 5,171,777
[45] Date of Patent: Dec. 15, 1992

[54] MISCIBLE BLENDS OF POLY(VINYL ACETATE) AND POLYMERS OF ACRYLIC ACID

[75] Inventors: Jeffrey A. Kuphal, Blandon; Lloyd M. Robeson; Dennis Sagl, both of Macungie, all of Pa.

[73] Assignee: Air Products and Chemicals, Inc., Allentown, Pa.

[21] Appl. No.: 633,830

[22] Filed: Dec. 26, 1990

[51] Int. Cl.$^5$ .................. C08L 25/08; C08L 31/04; C08L 33/08

[52] U.S. Cl. .................. 524/522; 525/301; 525/221; 525/932; 525/931

[58] Field of Search .............. 525/221, 301, 931, 932; 524/522

[56] References Cited

U.S. PATENT DOCUMENTS

| | | | |
|---|---|---|---|
| 3,066,043 | 11/1962 | Hechtman et al. | 525/221 |
| 3,236,914 | 2/1966 | Murdock et al. | 525/221 |
| 3,437,718 | 4/1969 | Rees | 525/221 |
| 3,580,972 | 5/1971 | Isaksen et al. | 525/221 |
| 4,111,878 | 9/1978 | Ruhf | 260/29.6 |
| 4,165,308 | 8/1979 | Serlin | 260/42.52 |
| 4,167,602 | 9/1979 | Serlin | 428/240 |
| 4,294,941 | 10/1981 | Owen, Jr. | 525/170 |
| 4,332,917 | 6/1982 | Heslinga et al. | 525/207 |
| 4,338,417 | 7/1982 | Heslinga et al. | 525/207 |
| 4,434,259 | 2/1984 | Gold et al. | 524/31 |
| 4,492,724 | 1/1985 | Allbright et al. | 428/40 |
| 4,500,598 | 2/1985 | Thoese | 428/331 |
| 4,673,616 | 6/1987 | Goodwin | 428/289 |

OTHER PUBLICATIONS

Hsieh and Wong (J. Chin. I. Ch. E., 19(1) 17 (1988).
Olabisi et al., *Polymer-Polymer Miscibility*, pp. 238-239, Academic Press, NY (1979).
Saunders, K. J., "Poly(vinyl acetate) and Related Polymers", *Organic Polymer Chemistry*, pp. 104-115, Chapman and Hall, London (1973).
Rodriguez, "Principles of Polymer Systems", pp. 98-101, 403-405, (McGraw-Hill, NY 1970).

*Primary Examiner*—Carman J. Seccuro, Jr.
*Attorney, Agent, or Firm*—Keith D. Gourley; James C. Simmons; William F. Marsh

[57] ABSTRACT

Blends of polymers of vinyl acetate and polymers derived from acrylic acid have been discovered which exhibit thermodynamic miscibility. These polymer blends exhibit excellent mechanical compatibility, provide enhanced toughness and strength superior to the sum of the weight averaged properties of the constituent polymers and are useful in molding structures such as films and in compounded formulations such as coatings, emulsions and adhesives.

20 Claims, No Drawings

MISCIBLE BLENDS OF POLY(VINYL ACETATE) AND POLYMERS OF ACRYLIC ACID

TECHNICAL FIELD

The present invention relates to blends of polymers of vinyl acetate and copolymers and terpolymers derived from acrylic acid which exhibit thermodynamic miscibility. Also disclosed are polymer emulsions comprising the subject polymer blends which can be formulated for use in coating, adhesive and related applications.

BACKGROUND OF THE INVENTION

As more sophisticated uses of polymeric systems are devised, researchers have attempted to meet the demand for development of new polymeric systems which exhibit properties tailored to particular end uses. New and useful polymeric systems have been developed which contain various additives designed to enhance particular properties of various polymers without imparting a substantial adverse effect on the inherent properties of such polymers. Enhanced properties have also been achieved by blending various polymers to achieve a balance of properties which are exhibited differentially by the individual polymers. Advantages gained by such blends typically relate to processing, for example, polymer rheology, or properties such as adhesion and toughness.

Unfortunately, the mixing of numerous combinations of individual polymers which possess highly desirable properties generally results in a phase separated mixture wherein the mixture of individual polymers does not provide a thermodynamically miscible blend. Decreased miscibility of the individual polymers comprising the blend typically results in a system which offers properties inferior to those of the individual polymers making up the blend. Thermodynamically miscible blends are assured of mechanical compatibility. While phase separated blends can offer useful properties, they often require modification in order to provide compatibility and to yield a system having a property balance of commercial significance.

The poor performance of phase separated blends of various polymers is typically caused by structural incompatibility (due to poor interfacial adhesion) wherein the respective polymers tend to interfere with each other's performance causing an unacceptable degradation in one or more of the desired properties. For example, admixture of poly(vinyl acetate) and homopolymers of styrene or acrylic acid results in an immiscible blend exhibiting poor mechanical compatibility.

Likewise, direct copolymerization of poly(vinyl acetate) and acrylic acid is not commercially practical because the reactivity of acrylic acid toward polymerization is significantly faster than that of vinyl acetate such that the initial polymer formed in a typical free radical polymerization is very high in acrylic acid content. After the acrylic acid is depleted, poly(vinyl acetate) is produced. The polymers of acrylic acid produced during the early stages of the polymerization are not miscible with the poly(vinyl acetate) produced during the later stages of the polymerization. The resulting phase separated blend typically exhibits inferior mechanical properties and will appear to be inhomogeneous. While the random copolymerization of poly(vinyl acetate) and poly(acrylates) can be achieved to some degree of success by the controlled addition of the more reactive monomer, the procedure is very difficult to control and reproduce particularly at higher (>5%) acrylic acid contents.

The immiscibility of important polymers has been noted in the literature. Hsieh and Wong (J. Chin. I. Ch. E., 19(10) 17(1988)) note the phase separation of blends of poly(vinyl acetate) and polystyrene. The investigators prepared thermodynamically miscible blends by formulating copolymers based on vinyl acetate/acrylic acid copolymers and styrene/4-vinyl pyridine copolymers. The paper fails to disclose blends of styrene/acrylic acid copolymers with poly(vinyl acetate).

Considerable research is being conducted in order to identify thermodynamically miscible polymer blends which offer the mechanical advantages of the respective polymers making up the blend while obviating the problems incurred in attempting to copolymerize the monomers. Olabisi, et. al., *Polymer-Polymer Miscibility*, pages 238-9, Academic Press, NY (1979), presents a survey of miscible polymer systems which includes poly(vinyl acetate) and vinyl acetate copolymers comprising blends of poly(vinyl acetate) and poly(vinylidene fluoride) and blends of poly(vinyl acetate) and poly(vinyl nitrate).

Saunders, K. J., "Poly(vinyl acetate) and Related Polymers", *Organic Polymer Chemistry*, pages 104-115, Chapman and Hall, London (1973), describes several different routes for preparing vinyl acetate monomers and discusses emulsion polymerization techniques for producing poly(vinyl acetate). The properties, applications in films and solubilities of the resulting polymers are discussed. Copolymers of vinyl acetate and alkyl acrylates, fumarates and maleates are described as is the conversion of poly(vinyl acetate) to poly(vinyl alcohol) and poly(vinyl acetals).

A need exists in the art for the preparation of blends of poly(vinyl acetate) and acrylic acid-containing copolymers and terpolymers which exhibit thermodynamic miscibility wherein single phase behavior is observed and wherein the resulting blends would be stable over sufficient periods of time to allow for processing and use in desired applications. Such thermodynamically miscible blends would be particularly useful in adhesive and coating applications.

BRIEF SUMMARY OF THE INVENTION

The present invention relates to stable blends of polymers of vinyl acetate and copolymers and terpolymers derived from acrylic acid which exhibit thermodynamic miscibility wherein the resulting blend is stable over the time periods required for processing and use in typical applications. Disclosed are polymer blends consisting essentially of (a) a first polymer containing at least 90 weight percent vinyl acetate units and (b) a second polymer having greater than 5 weight percent acrylic acid units and from 5 to 95 weight percent of one or more ethylenically unsaturated copolymerizable units selected from styrene, methyl acrylate and ethyl acrylate wherein the blend of the first and second polymers exhibits thermodynamic miscibility.

For example, thermodynamically miscible blends of poly(vinyl acetate) and acrylic-acid containing copolymers are readily prepared by the admixture of defined ratios of poly(vinyl acetate) and a copolymer containing from 5 to about 30 weight percent acrylic acid units and from 70 to 95 weight percent methyl acrylate units; a copolymer containing from 16 to about 40 weight percent acrylic acid units and from 60 to 84 weight percent styrene units; and a copolymer containing from 5 to about 40 weight percent acrylic acid units and from 60 to 95 weight percent ethyl acrylate units.

Blends of poly(vinyl acetate) and acrylic-acid containing terpolymers can also be prepared by the admixture of specified ratios of poly(vinyl acetate) and a terpolymer containing from 5 to about 30 weight percent acrylic acid units, 20 to 94 weight percent methyl acrylate units and up to 45 weight percent of one or more ethylenically unsaturated copolymerizable units selected from ethyl acrylate, n-butyl acrylate, 2-ethylhexyl acrylate and styrene; a terpolymer comprising from 16 to about 40 weight percent acrylic acid units; 20 to 83 weight percent styrene units and up to a total of 45 weight percent of one or more ethylenically unsaturated copolymerizable units selected from methyl acrylate, ethyl acrylate, n-butyl acrylate and 2-ethylhexyl acrylate; and terpolymers comprising from 5 to about 40 weight percent acrylic acid units, 20 to 94 weight percent ethyl acrylate units and up to a total of 45 weight percent of one or more ethylenically unsaturated copolymerizable units selected methyl acrylate, n-butyl acrylate, 2-ethylhexyl acrylate and styrene.

Stable emulsions or suspensions can be prepared utilizing the thermodynamically miscible blends of the present invention wherein such emulsions are suitable for use in coatings, adhesives, sealants, graphic arts and other applications which profit from the properties of the respective base polymers of the blends. The subject blends exhibit excellent mechanical compatibility and provide an improved balance of properties which cannot be adequately obtained by the unblended constituents.

DETAILED DESCRIPTION OF THE INVENTION

Poly(vinyl acetate) and various acrylic-acid containing copolymers are utilized in numerous applications. Considerable interest exists in devising compositions in the form of blends of poly(vinyl acetate) and polymers of acrylic monomers wherein the beneficial properties of each respective homopolymer can be used to advantage in coating, adhesive, sealant and related applications. Unfortunately, poly(vinyl acetate) exhibits phase separation when mixed with homopolymers of numerous ethylenically unsaturated polymerizable monomers including acrylic acid, ethyl acrylate, styrene, n-butyl acrylate and 2-ethylhexyl acrylate.

Applicants have discovered that copolymers comprising acrylic acid and styrene, methyl acrylate or ethyl acrylate and terpolymers of acrylic acid and various defined ethylenically unsaturated copolymerizable monomers provide thermodynamically miscible blends when mixed in the specified relative proportions with polymers comprising substantially all vinyl acetate units. The resulting blends of polymers of vinyl acetate and copolymers and terpolymers derived from acrylic acid are stable over the time periods required for processing and use in desired applications.

Applicants' discovery is significant as vinyl acetate does not easily copolymerize in a random fashion with copolymerizable monomers such as acrylate esters, styrene and acrylic acid. The thermodynamically miscible blends of this invention provide similar properties to those expected of a copolymer or terpolymer formed from the constituents of the claimed blends.

In polymer blends, excellent mechanical compatibility can generally be discerned by measuring the ultimate tensile properties, for example, tensile strength, energy to break and elongation. Mechanical compatibility is indicated when the blend values are at least as high as the weighted average value of the respective homopolymers making up the blend. In most polymer blends, however, these properties are expected to be below the weighted average values of the constituent homopolymers due to polymer incompatibility. The significant positive deviation in energy to break over the weighted average values in the case of polymer blends of the present invention is quite unexpected and is of considerable importance in adhesive applications.

The blends according to the present invention consist essentially of (a) a first polymer containing at least 90 weight percent vinyl acetate units and (b) a second polymer having greater than 5 weight percent acrylic acid units and from 5 to 95 weight percent of one or more ethylenically unsaturated copolymerizable units selected from styrene, methyl acrylate or ethyl acrylate wherein the first and second polymers exhibit thermodynamic miscibility.

The term, thermodynamic miscibility refers to the capability of the first and second polymers to mix in substantially all proportions within the domains established according to this Specification. Therefore, Applicants' invention does not contemplate the admixture of the above-mentioned polymers wherein such admixture results in a phase separated, thermodynamically immiscible blend.

The blends typically contain from 10 to 90 weight percent of the poly(vinyl acetate) polymer (the first polymer) and from 90 to 10 weight percent of the acrylic acid-containing copolymer or terpolymer (the second polymer). The thermodynamic miscibility of poly(vinyl acetate) and the acrylic acid-containing copolymers and terpolymers is regulated by the structure and the relative proportion of the monomers which are copolymerized with acrylic acid to provide the acrylic acid-containing second polymers.

Applicants have unexpectedly found that poly(vinyl acetate) is thermodynamically miscible with copolymers and terpolymers comprising defined ratios of acrylic acid units and various ethylenically unsaturated copolymerizable units. For example, blends are readily prepared by admixture of poly(vinyl acetate) with a copolymer containing from 5 to about 30 weight percent acrylic acid units and from 70 to 95 weight percent methyl acrylate units; a copolymer containing from 16 to about 40 weight percent acrylic acid units and from 60 to 84 weight percent styrene units; and a copolymer containing from 5 to about 40 weight percent acrylic acid units and from 60 to 95 weight percent ethyl acrylate units.

Blends of poly(vinyl acetate) can also be prepared by admixture with the following terpolymers including a terpolymer containing from 5 to about 30 weight percent acrylic acid units, 20 to 94 weight percent methyl acrylate units and up to 45 weight percent of one or more ethylenically unsaturated copolymerizable units selected from ethyl acrylate, n-butyl acrylate, 2-ethylhexyl acrylate and styrene units; a terpolymer comprising from 16 to about 40 weight percent acrylic acid units, 20 to 83 weight percent styrene units and up to a total of 45 weight percent of one or more ethylenically unsaturated copolymerizable units selected from methyl acrylate, ethyl acrylate, n-butylacrylate and 2-ethylhexyl acrylate; and terpolymers comprising from 5 to about 40 weight percent acrylate acid units, 20 to 94 weight percent ethyl acrylate units and up to a total of 45 weight percent of one or more ethylenically unsaturated copolymerizable units selected from methyl acrylate, n-butyl acrylate, 2-ethylhexyl acrylate and styrene.

The thermodynamically miscible blends of the present invention may contain from about 10 to 90 weight percent poly(vinyl acetate) and from 90 to 10 weight percent of the above-disclosed copolymers and terpolymers containing acrylic acid units. The term, terpolymer, contemplates a polymer comprising two, three, four or more distinct monomers as disclosed above.

Poly(vinyl acetate) is a well known article of commerce and has been used in various forms for over four decades. Typical applications include adhesives, sealants, coatings, chewing gun resin base and cellophane coatings. Poly(vinyl acetate) can be prepared by methods well known in the art including emulsion, suspension, solution or bulk polymerization techniques. Rodriguez, in "Principles of Polymer Systems", p 98–101, 403,405, (McGraw-Hill, NY, 1970) describes bulk and solution polymerization procedures and the specifics of emulsion polymerization.

When preparing poly(vinyl acetate) by suspension polymerization, the monomer is typically dispersed in water containing a suspending agent such as poly(vinyl alcohol) wherein an initiator such as peroxide is added thereto. The unreacted monomer is vaporized after polymerization is completed and the polymer is filtered and dried. An example of suspension polymerization is provided by Rodriguez, cited above.

Poly(vinyl acetate) can also be prepared via solution polymerization wherein the vinyl acetate is dissolved in a solvent in the presence of an initiator. Following completion of the polymerization, the polymer is recovered by coagulation and the solvent is removed by vaporization. Bulk polymerization is not normally practiced in the commercial manufacture of poly(vinyl acetate). However, bulk polymerization could be used when proper provisions are made for heat removal.

The acrylate/acrylic acid and styrene/acrylic acid copolymers and terpolymers of this invention can be prepared via polymerization processes known in the art. Such methods include, but are not limited to, bulk, suspension, solution and emulsion polymerization. When emulsion or suspension polymerization is employed, care must be taken to promote substantially all of the acrylic acid polymerization within the oil phase as acrylic acid has high water solubility and will distribute between the oil and aqueous phases.

The preparation of various acrylate and acrylic acid-containing copolymers is disclosed by Saunders in "Organic Polymer Chemistry", Chapter 6, (Chapman and Hall, London, 1973). Bulk or solution polymerization is preferred when the solubility of acrylic acid in the aqueous phase causes a limitation in the desired level of acrylic acid to be introduced into the copolymer to be formed.

As previously stated, copolymers of poly(vinyl acetate) are considered part of the invention to the extent that the copolymer contains at least 90 weight percent vinyl acetate units with the remaining 10 weight percent of the copolymer comprising units of one or more ethylenically unsaturated copolymerizable monomers selected from acrylates and meth(acrylates) having from 5 to 15 carbon atoms and alkenes having from 2 to 10 carbon atoms. Suitable acrylates and meth(acrylates) include, but are not limited to, methyl acrylate, methyl methacrylate, ethyl methacrylate, butyl acrylate, 2-ethylhexyl acrylate and the like. Suitable alkenes include, but are not limited to, ethylene, isobutylene and styrene.

Copolymers comprising poly(vinyl acetate) and its related copolymers, can be prepared by emulsion polymerization wherein a series of components are added to build the colloidal system in which polymerization is effected. Such components include, but are not limited to, a polymerization medium (e.g., water), monomer (vinyl acetate and comonomer if desired); emulsifying agent (e.g., aliphatic, long chain carboxylic or sulfonic acid salts); protective colloids (e.g., methylcellulose, hydroxyethyl cellulose or poly(vinyl alcohol)) and the like.

Additional components include surface tension regulators (e.g., aliphatic alcohols of medium chain length), initiators for polymerization (e.g., organic peroxides and persulfates); chain transfer agents to regulate molecular weight (e.g., dodecyl mercaptan) and pH regulators to control or adjust pH of the emulsion (e.g., buffers such as phosphates, carbonates and acetates).

The blends according to the present invention can also be modified by incorporating plasticizers such as those commonly used with poly(vinyl chloride). Examples of such plasticizers are dioctyl phthalate, diisooctyl azelate, triisononyl trimellitate, trioctyl trimellitate, diisononyl phthalate, dodecyl phthalate, epoxidized soybean oil, trioctyl phosphate, triphenyl phosphate, tricresyl phosphate and the like.

The blends can also contain various reinforcing agents such as fiberglass, carbon fibers and the like. Moreover, inorganic fillers such as wollastonite, glass beads, talc, calcium carbonate, clay, fumed silica and the like can be incorporated into the blends. Other additives such as pigments, thermal stabilizers, ultraviolet stabilizers, tackifiers, processing aids, flame retardants and impact modifiers can be used as is customary in compounding polymeric materials for specific uses.

The major constituents of the blends of the present invention. poly(vinyl acetate) and polymers of acrylic acid, are normally solid polymers having molecular weights sufficiently high such that tensile properties can be measured on molded specimens formed therefrom. The vinyl acetate and acrylate-containing polymers can be combined in a number of ways including milling the solid polymers or combining them as solutions in any suitable organic solvents such as toluene, methylene chloride, tetrahydrofuran, chloroform, acetone, methyl ethyl ketone or ethyl acetate.

A preferred method for preparing the blends of this invention comprises adding the acrylate-containing polymer to vinyl acetate followed by vinyl acetate polymerization. The typical molecular weight range for poly(vinyl acetate) is from 5,000 to 1,000,000, with a preferred range being from 10,000 to 500,000, while the typical molecular weight range for the acrylate-containing polymer is from 10,000 to 1,000,000 with the preferred range being from 15,000 to 500,000.

Another preferred method for preparing blends of this invention comprises a sequential polymerization technique wherein the monomers to be polymerized to form the desired acrylic acid copolymer or terpolymer are added to poly(vinyl acetate) followed by polymerization.

The polymer blends of the present invention and compositions which incorporate them can be used in various applications including coatings, adhesives or sealants and can also be used in molding objects or extruding films of various profiles. The blends can also be applied in solutions involving various organic solvents or as water-based emulsions. Suitable aqueous emulsions comprise water, an emulsifier or stabilizer; other desired additives as previously discussed and the desired thermodynamically miscible blend possessing the desired physical properties.

The following examples serve to provide specific illustrations of the practice of the present invention and are not intended in any way to limit the scope of this invention. Unless otherwise stated, all values are reported in units of weight percent.

EXPERIMENTAL

Glass transition temperatures were obtained on a Perkin-Elmer DSC-2 at a heating rate of 10° C./minute. Weight average molecular weights were determined at 25° C. in tetrahydrofuran at a flow rate of 1.0 ml/minute. A non-universal calibration relative to the retention times of narrow distribution polystyrene standards was employed. Melt flow data was obtained using a Tinuis-Olsen Melt Indexer similar to a procedure described in ASTM D-1238. Melt flow values were determined after ten minute (MF10) and thirty minute (MF30) preheats at conditions of 200° C. and 44 psi. Inherent viscosities (IV) were determined at 25° C. in tetrahydrofuran using a 0.2 wt % solution. Tensile modulus values were obtained on compression molded plaques utilizing a procedure similar to ASTM D-638 adapted to small scale evaluation.

SUMMARY OF THE EXAMPLES

| EXAMPLE(S) | DESCRIPTION |
|---|---|
| 1-17 | Acrylic acid-containing copolymers |
| 18-21 | Styrene/acrylic acid copolymers |
| 22-26 | Acrylate/acrylic acid copolymers |
| 27-30 | Thermodynamically immiscible blends of poly(vinyl acetate) and various homopolymers |
| 31-38 | Blends of poly(vinyl acetate) and styrene/acrylic acid copolymers |
| 39-45 | Blends of poly(vinyl acetate) and acrylate/acrylic acid copolymers; |
| 46-49 | Blends of poly(vinyl acetate) and acrylate/(meth)acrylic acid copolymers |
| 50-55 | Blends of poly(vinyl acetate) and ethyl acrylate/acrylic acid copolymers |
| 56-65 | Blends of poly(vinyl acetate) and methyl acrylate/acrylic acid copolymers; |
| 66-71 | Blends of poly(vinyl acetate) and terpolymers comprising acrylic acid units |
| 72-76 | Emulsions comprising poly(vinyl acetate)/copolymeric blends |
| 77 | Films/Molds prepared from poly(vinyl acetate)/copolymeric emulsions |
| 78-81 | Films/Molds prepared from poly(vinyl acetate)/copolymeric emulsions |

EXAMPLES 1-17

PREPARATION OF VARIOUS ACRYLIC ACID-CONTAINING COPOLYMERS AND TERPOLYMERS

The following general procedure was used to prepare various acrylic acid-containing copolymers and terpolymers. A solution of the specified ethylenically unsaturated copolymerizable monomers, in the feed ratio defined in Table 1, and an initiator were added to the reaction solvent and the solution was deoxygenated by bubbling nitrogen into the solution for 5 minutes. The solution was then heated to 60° C. under nitrogen for 19 h. The resulting copolymer or terpolymer was isolated by precipitating in water and drying in a vacuum oven (60° C./1 torr). Specific product yields and physical properties are outlined in Table 1. All products provided satisfactory spectral analyses.

TABLE 1

Properties of Acrylic Acid-Containing Copolymers and Terpolymers

| Example | Monomers[1] | Solvent | Initiator[2] | Feed Ratio (wt %) | Composition[3] (wt %) | Conversion (%) | IV[4] (dl/g) | Tg (°C.) |
|---|---|---|---|---|---|---|---|---|
| 1 | MA/AA | methanol | TBPND | 85/15 | 87/13 | 97 | 0.61 | 21 |
| 2 | MA/AA | methanol | TBPND | 90/10 | 91/9 | 94 | 0.65 | 18 |
| 3 | MA/AA | methanol | TBPND | 70/30 | 75/25 | 81 | 0.83 | 55 |
| 4 | MA/2-EHA/AA | methanol | TBPND | 40/40/20 | 42/43/15 | 96 | 0.77 | −2 |
| 5 | 2-EHA/AA | methanol | TBPND | 60/40 | 67/33 | 97 | 0.80 | 45 |
| 6 | MMA/AA | methanol | TBPND | 85/15 | 92/8 | 91 | 0.42 | 117 |
| 7 | BA/MA/AA | methanol | TBPND | 60/20/20 | 64/21/15 | 95 | 0.73 | 8 |
| 8 | EA/AA | methanol | TBPND | 75/25 | 77/23 | 97 | 0.81 | 31 |
| 9 | MA/AA | methanol | TBPND | 49/51 | 48/52 | 89 | 0.87 | 81 |
| 10 | MA/MAA | methanol | TBPND | 90/10 | 90/10 | 97 | 0.62 | 25 |
| 11 | MMA/AA | methanol | TBPND | 70/30 | 76/24 | 76 | 0.45 | 121 |
| 12 | EA/AA | methanol | TBPND | 92/8 | 93/7 | 97 | 0.92 | 1 |
| 13 | EA/AA | methanol | TBPND | 65/35 | 68/32 | 98 | 1.02 | 55 |
| 14 | BA/MA/AA | methanol | TBPND | 40/40/20 | 42/40/18 | 97 | 0.92 | 28 |
| 15 | MA/2-EHA/AA | methanol | TBPND | 50/40/10 | 40/40/20 | 97 | 0.81 | −1 |
| 16 | ST/AA | tert-butanol | BP | 60/40 | 69/31 | 87 | 0.34 | 144 |
| 17 | ST/AA | tert-butanol | BP | 70/30 | 78/22 | 89 | 0.48 | 130 |

[1]MA = methyl acrylate; AA = acrylic acid; 2-EHA = 2-ethylhexyl acrylate; MMA = methyl methacrylate; BA = butyl acrylate; EA = ethyl acrylate; MAA = methacrylic acid; ST = styrene
[2]TBPND = tert-butylperoxy neodecanoate BP = benzoyl peroxide
[3]Determined via $^{13}$C NMR.
[4]Determined on a 0.2 wt % solution in THF at 25° C.

EXAMPLES 18-21

PREPARATION OF STYRENE/ACRYLIC ACID COPOLYMERS

The following styrene/acrylic acid copolymers were prepared via bulk reaction in an extruder followed by compression molding into 20 and 40 mil plaques for observation and testing. The following styrene/acrylic acid copolymers were prepared by reactive extrusion in a 60 mm corotating twin screw extruder with an L/d=50. The polymer products prepared in this reactor extruder were fed, via gear pumps, to a compounding extruder for devolatilization of residual monomers.

Mixtures of styrene and acrylic acid monomers, in the desired feed ratios (Table 2), were combined with an inert diluent (5-10 wt. % toluene) and an appropriate initiator (1-3 mmole tert-butyl perbenzoate per mole of monomer). The reactant mixtures were fed into the reactor extruder at rates of 9-10 kg/h. The temperature in the reactor extruder was maintained at 140° C., and the temperature in the compounding extruder was maintained at 190° C. Properties of the resulting polymers were measured and are summarized in Table 2.

TABLE 2

PROPERTIES OF VARIOUS STYRENE/ACRYLIC ACID COPOLYMERS

| Example | Styrene/Acrylic Acid Feed Ratio (by wt) | Mw | Tg (°C.) | MF10 (dg/min) | MF30 (dg/min) |
|---|---|---|---|---|---|
| 18 | 92/8 | 86,000 | 125 | 6.74 | 7.27 |
| 19 | 86/14 | 83,000 | 137 | 2.93 | 2.97 |
| 20 | 80/20 | 71,000 | 142 | 5.03 | 5.02 |
| 21 | 82/18 | 138,000 | 139 | 0.68 | 0.66 |

EXAMPLES 22-26

PREPARATION OF ACRYLATE/ACRYLIC ACID COPOLYMERS

A series of acrylate/acrylic acid copolymers were prepared by bulk reaction in an extruder followed by compression molding into 20 and 40 mil plaques for observation and testing. A series of acrylate/acrylic acid and acrylate/methacrylic acid copolymers were prepared using the same reactive extrusion equipment described in Examples 18-21.

Mixtures of the acrylate monomers, in the desired feed ratios (Table 3), were combined with an inert diluent (5-10 weight percent n-propanol), and an appropriate initiator (1-3 mmole tert-butyl peroctoate per mole of monomers). The reactant mixtures were fed into the reactor extruder at rates of 9-10 kg/h. The temperature in the extruder reactor was maintained at 110° C., and the temperature in the compounding extruder was maintained at 180° C. Properties of the resulting polymers were measured and are summarized in Table 3.

TABLE 3

PROPERTIES OF VARIOUS ACRYLATE/ACRYLIC ACID COPOLYMERS

| Example | Composition | Feed Ratio | IV (dl/g) | Tg (°C.) | Tensile Modulus (psi) |
|---|---|---|---|---|---|
| 22 | nBA/AA | 80/20 | 0.56 | −17 | * |
| 23 | EA/AA | 85/15 | 0.48 | 7 | * |
| 24 | EA/MAA | 80/20 | 0.47 | 23 | 59,000 |
| 25 | EA/MAA | 75/25 | 0.52 | 44 | 110,000 |
| 26 | nBMA/EA/MAA | 3/3/1 | 0.39 | 29 | 33,000 |

MA = methyl acrylate
EA = ethyl acrylate
AA = acrylic acid
MAA = methacrylic acid
nBA = n-butyl acrylate
nBMA = n-butyl methacrylate
*Too soft to test at 25° C.

EXAMPLE 27-30

PREPARATION OF MELT BLENDS OF POLY(VINYL ACETATE) AND VARIOUS HOMOPOLYMERS

Melt blends of poly(vinyl acetate) and polystyrene, poly(methyl acrylate) and poly(ethyl acrylate) were prepared in a brabender at the temperatures designated in Table 4 and then compression molded into 20 and 40 mil plaques for observation and further testing. The poly(vinyl acetate) was obtained from Scientific Polymer Products Inc. and had a Mw of 258,000 and a density of 1.191 g/cc The polystyrene was obtained from Aldrich Chemical Company and had a Mw of 258,000. The poly(methyl acrylate) and poly(ethyl acrylate) were obtained from Scientific Polymer Products and had a Mw of 43,000 and 95,000, respectively.

The phase behavior of poly(vinyl acetate) blends with polystyrene (Example 27) and poly(ethyl acrylate) (Example 29) indicated phase separation as determined by differential scanning calorimetry (DSC). The blend of poly(vinyl acetate) and poly(methyl acrylate) (Example 28) was transparent and exhibited a single Tg in both DSC and dynamic mechanical spectroscopy (DMS) analysis.

TABLE 4

PROPERTIES OF MELT BLENDS OF POLY(VINYL ACETATE) AND VARIOUS HOMOPOLYMERS

| Example | Composition | Feed Ratio | Melt Blending Temperature | Compression Molded Plaque Appearance | DSC Tg (°C.) | DMS Tg (°C.) |
|---|---|---|---|---|---|---|
| 27 | PVAc/PS | 50/50 | 150° C. | Opaque | 40,103 | — |
| 28 | PVAc/PMA | 70/30 | 120° C. | Transparent | 28 | 42 |
| 29 | PVAc/PEA | 70/30 | 100° C. | Hazy | −21,36 | — |
| 30 | PVAc | 100 | | Transparent | 35 | 46 |

PVAc = poly(vinyl acetate)
PMA = poly(methyl acrylate)
PS = poly(styrene)
PEA = poly(ethyl acrylate)

EXAMPLES 31-38

PREPARATION OF BLENDS OF POLY(VINYL ACETATE) AND STYRENE/ACRYLIC ACID COPOLYMERS

Various blends were prepared in a brabender at temperatures ranging from 180° to 200° C. The resulting blends were compression molded at 180°-200° C. into 20 and 40 mil plaques. Table 5 discloses the properties of the various defined blends of poly(vinyl acetate) and styrene/acrylic acid copolymers. Examples 33 through 38, inclusive, demonstrate that blends comprising the defined proportions of poly(vinyl acetate) and a copolymer comprising up to about 82 weight percent styrene and the remainder comprising acrylic acid provide a thermodynamical miscibility. In contrast, Examples 31 and 32 (comprising blend of poly(vinyl acetate) and a styrene/acrylic acid copolymer having greater than about 86 weight percent styrene units) provided thermodynamically immiscible blends having an opaque appearance.

sessed by observation of the transparency or turbidity of the sample. The samples were then cast in a petri dish and the solvent was devolatilized. The resulting films were examined for homogeneity as determined by transparency, translucency and opacity.

The results according to Table 6 demonstrate the unexpected thermodynamic miscibility of the blends according to the claimed invention. More particularly,

TABLE 5

PROPERTIES OF VARIOUS MELT BLENDS OF POLY(VINYL ACETATE) AND STYRENE/ACRYLIC ACID COPOLYMERS

| Example | Polymer Blend | Tensile Modulus (psi) | Tensile Strength (psi) | Elongation at Break (%) | Tg (°C.) | Optical Appearance |
|---|---|---|---|---|---|---|
| 31 | 50% PVAc 50% S/AA (92/8) | 305,000 | 2,600 | 2 | 42,121 | Opaque |
| 32 | 50% PVAc 50% S/AA (86/14) | 300,000 | 4,900 | 2 | 62,129 | Translucent to opaque |
| 33 | 50% PVAc 50% S/AA (82/18) | 291,000 | 7,600 | 4 | 68 | Transparent to translucent |
| 34 | 50% PVAc 50% S/AA (80/20) | 285,000 | 5,400 | 2 | 74 | Transparent |
| 35 | 50% PVAc 50% S/AA (78/22) | 371,000 | 6,500 | 3 | 88 | Transparent |
| 36 | 50% PVAc 50% S/AA (69/31) | 375,000 | 7,500 | 3 | 92 | Transparent |
| 37 | 75% PVAc 25% S/AA (82/18) | 296,000 | 6,800 | 5 | 49 | Transparent |
| 38 | 25% PVAc 75% S/AA (82/18) | 321,000 | 5,800 | 3 | 98 | Transparent |

PVAc = poly(vinyl acetate)
S = styrene
AA = acrylic acid

EXAMPLES 39–45 (COMPARATIVE)

PREPARATION OF BLENDS OF POLY(VINYL ACETATE) AND ACRYLATE/ACRYLIC ACID COPOLYMERS

The following general procedure was used to prepare blends of poly(vinyl acetate) and various acrylate/acrylic acid copolymers. A blend of poly(vinyl acetate) and the copolymers according to Table 6 (50 weight percent/50 weight percent ratio) were prepared in methylene chloride to provide a solution having approximately 6–8 wt % solids. The dissolved solution was agitated and the phase behavior was qualitatively assessed.

Examples 39 through 41 demonstrate that blends of poly(vinyl acetate) and copolymers of acrylic acid and n-butyl acrylate and 2-ethylhexyl acrylate, respectively, do not provide thermodynamic miscibility. Examples 43 through 45 demonstrate that blends of poly(vinyl acetate) and copolymers of (methyl)methylacrylate and ethyl acrylate, methyl acrylate and methacrylic acid, respectively, also fail to provide thermodynamic miscibility. However, Example 42 demonstrates that a blend of 50 weight percent poly(vinyl acetate) and 50 weight percent of a copolymer of ethyl acrylate and acrylic acid (85/15) provides thermodynamic miscibility.

TABLE 6

(COMPARATIVE) PROPERTIES OF BLENDS OF POLY(VINYL ACETATE) AND ACRYLATE/ACRYLIC ACID COPOLYMERS

| Example | Composition | Copolymer Feed Ratio | Phase Behavior in Solution | Solid State Phase Behavior |
|---|---|---|---|---|
| 39 | 50% PVAc 50% nBA/AA | (85/15) | Single phase | Phase separated |
| 40 | 50% PVAc 50% 2-EHA/AA | (86/14) | Phase separated | Phase separated |
| 41 | 50% PVAc 50% nBA/AA | (77/23) | Phase Separated | Phase separated |
| 42 | 50% PVAc 50% EA/AA | (85/15) | Single phase | Single phase |
| 43 | 50% PVAc 50% EA/MAA | (80/20) | Single phase | Phase separated |
| 44 | 50% PVAc 50% MA/MAA | (50/50) |  | Phase separated |
| 45 | 50% PVAc |  |  |  |

TABLE 6-continued
(COMPARATIVE) PROPERTIES OF BLENDS OF POLY(VINYL ACETATE) AND ACRYLATE/ACRYLIC ACID COPOLYMERS

| Example | Composition | Copolymer Feed Ratio | Phase Behavior in Solution | Solid State Phase Behavior |
|---|---|---|---|---|
| | 50% MMA/AA | (76/24) | | Phase separated |

MA = methyl acrylate
EA = ethyl acrylate
AA = acrylic acid
nBA = n-butyl acrylate
2-EHA = 2-ethylhexyl acrylate
MAA = methacrylic acid

EXAMPLES 46–49
PREPARATION OF BLENDS OF POLY(VINYL ACETATE) AND ACRYLATE/(METH)ACRYLIC ACID COPOLYMERS

Blends of poly(vinyl acetate) and various acrylate/(meth)acrylic acid copolymers were prepared in a brabender. The resulting blends were compression molded into 20 and 40 mil plaques and tested for mechanical properties. The results are provided in Table 7.

Examples 46 and 48 demonstrate that partially miscible blends result when 50 weight percent poly(vinyl acetate) is admixed with 50 weight percent of a copolymer comprising from 75 to 85 weight percent ethyl acrylate and the remainder comprising methacrylic acid. The proximity of the Tg's of the constituent blended polymers do not allow for clean resolution of the phase behavior. Example 49 demonstrates that a blend comprising 50 weight percent poly(vinyl acetate) and 50 weight percent of an n-butyl methacrylate/ethyl acrylate/methacrylic acid terpolymer (3/3/1) results in a thermodynamically immiscible blend as evidenced by the two discrete Tg points representing the respective polymers. In contrast, a blend of 50 weight percent poly(vinyl acetate) and 50 weight percent of a copolymer comprising 85 weight percent ethyl acrylate units and 15 weight percent acrylic acid units (Example 47) provides a thermodynamically miscible blend.

EXAMPLES 50–56
PREPARATION OF A BLEND OF POLY(VINYL ACETATE) AND AN ETHYL ACRYLATE/ACRYLIC ACID COPOLYMER

Various blends of poly(vinyl acetate) and ethyl acrylate/acrylic acid copolymers were prepared in a brabender at 120° C. The resulting blends were transparent and were compression molded into 20 and 40 mil plaques for testing. The mechanical properties of the blends and the constituent polymers are listed in Table 8. Examples 52 through 55 provide thermodynamically miscible blends wherein Example 52, in particular, exhibits higher tensile strength and tensile modulus values compared to the weighted average of the properties of the constituent polymers (Examples 50 and 51) making up the blend. The significant positive deviation in tensile strength over the weighted average values of the constituent polymers is quite unexpected and is of considerable importance in numerous applications.

TABLE 8
PHYSICAL PROPERTIES OF A BLEND OF POLY(VINYL ACETATE) AND AN ETHYL ACRYLATE/ACRYLIC ACID COPOLYMER

| Example | Composition | Tensile Modulus (psi) | Tensile Strength (psi) | Elongation @ Break (%) | DSC Tg (°C.) |
|---|---|---|---|---|---|
| 50 | PVAc | 32,000 | 1,700 | 485 | 35 |
| 51 | EA/AA (85/15) | Too soft to test at 25° C. | | | |
| 52 | 50% PVAc 50% EA/AA (85/15) | 28,000 | 1,900 | 300 | 28 |
| 53 | 50% PVAc | 9,900 | 2,200 | 450 | 19 |

TABLE 7
PROPERTIES OF BLENDS OF POLY(VINYL ACETATE AND ACRYLATE/METH(ACRYLIC ACID) COPOLYMERS

| Example | Composition | Tensile Modulus (psi) | Tensile Strength (psi) | Elongation at Break (%) | Tg (°C.) | Transparency |
|---|---|---|---|---|---|---|
| 46 | 50% PVAc 50% EA/MAA (80/20) | 145,000 | 3,600 | 300 | 41 | Slightly hazy |
| 47 | 50% PVAc 50% EA/AA (85/15) | 28,000 | 1,900 | 300 | 28 | Transparent |
| 48 | 50% PVAc 50% EA/MAA (75/25) | 120,000 | 4,100 | 100–500 | 35 | Slightly hazy |
| 49 | 50% PVAc 50% nBMA/EA/MAA (3/3/1) | 41,000 | 1,800 | 130 | 39,47 | Opaque |

PVAc = poly(vinyl acetate)
MA = methyl acrylate
EA = ethyl acrylate
AA = acrylic acid
nBA = n-butyl acrylate
2-EHA = 2-ethylhexyl acrylate
MAA = methacrylic acid

TABLE 8-continued
PHYSICAL PROPERTIES OF A BLEND OF POLY(VINYL ACETATE) AND AN ETHYL ACRYLATE/ACRYLIC ACID COPOLYMER

| Example | Composition | Tensile Modulus (psi) | Tensile Strength (psi) | Elongation @ Break (%) | DSC Tg (°C.) |
|---|---|---|---|---|---|
| 54 | 50% EA/AA (93/7) 50% PVAc | 39,000 | 2,100 | 360 | 30 |
| 55 | 50% EA/AA (77/23) 50% PVAc | 343,000 | 8,200 | 4 | 39 |
| | 50% EA/AA (68/32) | | | | |

PVAc = poly(vinyl acetate)
EA = ethyl acrylate
AA = acrylic acid

EXAMPLE 56-65

PREPARATION OF BLENDS OF POLY(VINYL ACETATE) AND METHYL ACRYLATE/ACRYLIC ACID COPOLYMERS

Blends of poly(vinyl acetate) and methyl acrylate/acrylic acid copolymers were prepared in a brabender at temperatures ranging from 120°-140° C. The resulting blends were compression molded into 20 mil plaques and subjected to mechanical and calorimetric testing. The results are described in Table 9.

Examples 60 through 65, inclusive, defining various blends of poly(vinyl acetate) and methyl acrylate/acrylic acid copolymers, provide thermodynamically miscible blends which exhibit tensile strength values which are unexpectedly greater than those exhibited by the poly(vinyl acetate) homopolymer (Example 59) or the methyl acrylate/acrylic acid copolymers (Runs 56 through 58). For example, a blend comprising 75 weight percent poly(vinyl acetate) and 25 weight percent of a copolymer comprising 85 weight percent methyl acrylate and 15 weight percent acrylic acid (Example 60) exhibits a tensile strength of 6,200 psi. In contrast, poly(vinyl acetate) (Example 59) exhibits a tensile strength of only 1,700 psi.

TABLE 9
PROPERTIES OF BLENDS OF POLY(VINYL ACETATE) AND METHYL ACRYLATE/ACRYLIC ACID COPOLYMERS

| Example | Composition | Copolymer Feed Ratio | Compression Molded Sample Appearance | DSC Tg (°C.) | DMS Tg (°C.) | Tensile Modulus (psi) | Tensile Strength (psi) | Elongation (%) |
|---|---|---|---|---|---|---|---|---|
| 56 | MA/AA | (90/10) | Transparent | 18 | 38 | 1,100 | 850 | 900 |
| 57 | MA/AA | (85/15) | Transparent | 21 | 42 | 2,100 | 1,300 | 900 |
| 58 | MA/AA | (70/30) | Transparent | 55 | — | — | — | — |
| 59 | PVAc | | Transparent | 35 | 46 | 32,000 | 1,700 | 465 |
| 60 | 75% PVAc 25% MA/AA | (85/15) | Transparent | 36 | 48 | 230,000 | 6,200 | 170 |
| 61 | 50% PVAc 50% MA/AA | (85/15) | Transparent | 36 | 49 | 59,000 | 2,500 | 260 |
| 62 | 75% PVAc 25% MA/AA | (90/10) | Transparent | 35 | 45 | 97,000 | 3,500 | 230 |
| 63 | 50% PVAc 50% MA/AA | (90/10) | Transparent | 26 | 42 | 30,000 | 1,900 | 385 |
| 64 | 60% PVAc 40% MA/AA | (70/30) | Slightly Hazy | 28 | 55 | 108,000 | 4,500 | 230 |
| 65 | 50% PVAc 50% MA/AA | (48/52) | Phase Separation | | | | | |

PVAc = poly(vinyl acetate) MA = methyl acrylate AA = acrylic acid

EXAMPLE 66

PREPARATION OF BLENDS OF POLY(VINYL ACETATE) AND METHACRYLATE/2-ETHYLHEXYL ACRYLATE/ACRYLIC ACID TERPOLYMERS

Blends of poly(vinyl acetate) and various acrylic acid containing terpolymers were prepared in a brabender at temperatures ranging from 120°-140° C. The resulting blends were compression molded into 20 mil plaques and subjected to mechanical and calorimetric testing. The results are described in Table 10. Examples 66, 67 and 69 demonstrate that the blending of 50 weight percent poly(vinyl acetate) and terpolymers comprising acrylic acid, methyl acrylate and either 2-ethylhexyl acrylate or n-butyl acrylate provide thermodynamically miscible blends.

TABLE 10
PHYSICAL PROPERTIES OF BLENDS OF POLY(VINYL ACETATE) AND ACRYLIC ACID CONTAINING TERPOLYMER

| Example | Composition | Copolymer Feed Ratio | Tensile Modulus (psi) | Tensile Strength (psi) | Elongation at Break (%) | Tg (DSC) (°C.) |
|---|---|---|---|---|---|---|
| 66 | 50% PVAc 50% MA/2-EHA/AA | (40/40/20) | 9,900 | 2,000 | 490 | 30 |
| 67 | 75% PVAc 25% MA/2-EHA/AA | (40/40/20) | 84,000 | 2,800 | 310 | 38 |
| 68 | 50% PVAc 50% MA/2-EHA/AA | (50/40/10) | 21,500 | 1,300 | 424 | −3,37 |
| 69 | 50% PVAc 50% nBA/MA/AA | (42/40/18) | 148,000 | 5,200 | 247 | 29 |
| 70 | 50% PVAc 50% nBA/MA/AA | (64/21/15) | Phase Separated | | | |
| 71 | 50% PVAC | (60/15/25) | | | | 75 |

TABLE 10-continued

PHYSICAL PROPERTIES OF BLENDS
OF POLY(VINYL ACETATE) AND ACRYLIC ACID CONTAINING TERPOLYMER

| Example | Composition | Copolymer Feed Ratio | Tensile Modulus (psi) | Tensile Strength (psi) | Elongation at Break (%) | Tg (DSC) (°C.) |
|---|---|---|---|---|---|---|
| | 50% St/2-EHA/AA | | | | | |

PVAc = poly(vinyl acetate)
MA = methyl acrylate
EA = ethyl acrylate
AA = acrylic acid
nBA = n-butyl acrylate
2-EHA = 2-ethylhexyl acrylate
St = styrene

EXAMPLES 72-76

POLY(VINYL ACETATE)/COPOLYMERIC EMULSIONS PREPARED BY POST POLYMERIZATION

A preferred method of blend preparation involves the sequential polymerization of the acrylic acid-containing copolymer in an emulsion or suspension of poly(vinyl acetate). The following general procedure was used to prepare various acrylic acid-containing copolymers and terpolymers. A solution of the specified ethylenically unsaturated copolymerizable monomers, in the feed ratio defined in Table 11, and an initiator were added to the base emulsion. The mixture was purged above the surface with nitrogen for 30 minutes, and then heated at 55° C. for 2 h, followed by 4 h at 60° C. The reaction mixture was cooled and the final emulsion was obtained. The composition and properties of the subject emulsions are provided in Table 11.

TABLE 11

PROPERTIES OF POLY(VINYL ACETATE) EMULSION BLENDS PREPARED BY POST POLYMERIZATION

| Example | Base Emulsion[2] | Blend Ratio (wt %) | Acrylate Monomers[1] | Feed Ratio (wt %) | pH | % Solids | Viscosity (cps) | Tg (°C.) |
|---|---|---|---|---|---|---|---|---|
| 72 | Vinac 881 | 80/20 | MA/AA | 90/10 | 4.97 | 52.0 | 130 | 40 |
| 73 | Vinac 881 | 60/40 | MA/AA | 90/10 | 4.72 | 51.3 | 62.5 | 38 |
| 74 | Vinac 881 | 80/20 | EA/AA | 90/10 | 4.87 | 51.8 | 130 | 39 |
| 75 | Vinac 881 | 60/40 | EA/AA | 90/10 | 4.60 | 51.0 | 67 | 36,0 |
| 76 | Vinac XX-210 | 80/20 | ST/AA | 80/20 | 3.58 | 57.8 | 2385 | 31,135 |

[1]MA = methyl acrylate; AA = acrylic acid; EA = ethyl acrylate; ST = styrene
[2]Vinac 881 is a poly(vinyl acetate) emulsion sold by Air Products and Chemicals, Inc.
Vinac XX-210 is a partially acetylated poly(vinyl alcohol) stabilized poly(vinyl acetate) emulsion sold by Air Products and Chemicals, Inc.

EXAMPLE 77

PHYSICAL PROPERTIES OF FILMS AND MOLDED SAMPLES PREPARED FROM POLY(VINYL ACETATE)/COPOLYMERIC EMULSIONS

A solution of ethyl acrylate (66.00 g), acrylic acid (7.33 g) and azoisobutyronitrile (1.467 g) was added over 30 minutes to 200 g of Vinac XX-210, a partially acetylated poly(vinyl alcohol) stabilized poly(vinyl acetate) emulsion, obtained from Air Products and Chemicals, Inc., which had been diluted with water (62 g). Stirring was maintained at 200 rpm during addition. The mixture was purged above the surface with nitrogen for 30 minutes, and then heated at 60° C. for 4h. The reaction mixture was cooled and 312.70 g of product emulsion was obtained.

The resulting emulsion was cast into films and molded into plaques and tested for mechanical properties including Tg measurement by DMS. The results presented in Table 12 demonstrate that cast films and compression molded plaques exhibit substantially higher elongation at break thereby demonstrating a significant improvement in toughness compared to the Vanac XX-210 control. Example 77 cast film appeared even more transparent than the control Vinac XX-210 poly(vinyl acetate).

TABLE 12

FILMS AND MOLDED SAMPLES PREPARED FROM POLY(VINYL ACETATE)/COPOLYMERIC EMULSIONS

| Composition | Tensile Modulus (psi) | Tensile Strength (psi) | % Elongation @ Break | Tg (°C.) (DSC) |
|---|---|---|---|---|
| Vinac XX-210 (cast film) | 223,000 | 4,100 | 2 | 48 |
| Vinac XX-210 (compression molded) | 284,000 | 6,600 | 5 | 50 |
| Example 77 (cast film) 50 wt % PVAc emulsion 50 wt % EA/AA (85/15) | 9,000 | 2,000 | 314 | 28 |
| Example 77 (compression molded) 50 wt % PVAc emulsion 50 wt % EA/AA (85/15) | 5,200 | 2,300 | 279 | 38 |

EXAMPLES 78-81

PROPERTIES OF MOLDED SAMPLES PREPARED FROM POLY(VINYL ACETATE)/STYRENE/ACRYLIC ACID COPOLYMER BLENDS

Blends of poly(vinyl acetate) and styrene/acrylic acid (80/20) copolymer were prepared in a brabender at 180 to 200° C. The resulting blends were compression molded at 180°-200° C. into 20 mil plaques. The resulting plaques were transparent and exhibited thermodynamic miscibility evidenced by the single glass transition values as noted in Table 13.

TABLE 13
MOLDED SAMPLES PREPARED FROM POLY(VINYL ACETATE)/STYRENE/ACRYLIC ACID COPOLYMER BLENDS

| Example | Polymer Blend | Tg (°C.) |
|---|---|---|
| 78 | 90% PVAc<br>10% S/AA (80/20) | 48 |
| 79 | 75% PVAc<br>25% S/AA (80/20) | 50 |
| 80 | 25% PVAc<br>75% S/AA (80/20) | 101 |
| 81 | 10% PVAc<br>90% S/AA (80/20) | 125 |

PVAc = poly(vinyl acetate)
S = styrene
AA = acrylic acid

Stable emulsions can be prepared utilizing the miscible blends of the present invention wherein such emulsions find application in coatings, adhesives, sealants, graphic arts and other applications which profit from the properties of the respective base polymers of the blends. The subject blends exhibit excellent mechanical compatibility and are useful in molding structures such as films or in compounded formulations such as emulsions and adhesives. The blends according to the present invention exhibit excellent mechanical compatibility which has been demonstrated by measuring the energy to break as well as tensile strength and ultimate elongation of various polymer combinations.

The polymer blends show an improved balance of properties in specific cases over what would be expected from the weighted average values for the constituent polymers. In polymer blends, excellent mechanical compatibility can generally be discerned by measuring the ultimate tensile properties, for example the tensile strength, energy to break and elongation, and if these values are as high as the weighted average values, mechanical compatibility is indicated. In most polymer blends, however, these properties are expected to be below the weighted average values because of incompatibility. The significant positive deviation in energy to break over the weighted average values in the case of polymer blends of this invention is quite unexpected and is of considerable importance in adhesive applications.

The blends of the present invention offer a means for combining acrylic acid, acrylates and styrene into poly(vinyl acetate) which would otherwise be difficult or impossible to achieve by normal copolymerization techniques.

Various other embodiments and aspects of our invention will occur to those skilled in the art without departing from the spirit or scope of the invention. Having thus described the present invention, what is now deemed appropriate for Letters Patent is set out in the following appended claims.

We claim:

1. A polymer blend consisting essentially of (a) a first polymer consisting essentially of at least 90 weight percent vinyl acetate units and (b) a second polymer consisting essentially of at least 10 weight percent acrylic acid units and from 5 to 90 weight percent of one or more ethylenically unsaturated copolymerizable units selected from styrene, methyl acrylate, ethyl acrylate, n-butyl acrylate or 2-ethylhexyl acrylate, with the proviso that said second polymer contain at least one copolymerizable unit selected from the group consisting of styrene, methyl acrylate, and ethyl acrylate, wherein the blend of the first and second polymers exhibits thermodynamic miscibility.

2. The blend according to claim 1 wherein the blend contains 10 to 90 weight percent of the first polymer and from 90 to 10 weight percent of the second polymer.

3. The blend according to claim 2 wherein the first polymer is poly(vinyl acetate).

4. The blend according to claim 3 wherein the second polymer consisting essentially of from 10 to about 30 weight percent acrylic acid units and from 70 to 90 weight percent methyl acrylate units.

5. The blend according to claim 3 wherein the second polymer consisting essentially of 5 to about 30 weight percent acrylic acid units, at least 20 weight percent methyl acrylate units and up to a total of 45 weight percent of one or more ethylenically unsaturated copolymerizable units selected from ethyl acrylate, n-butyl acrylate, 2-ethylhexyl acrylate and styrene.

6. The blend according to claim 3 wherein the second polymer consisting essentially of 5 to about 30 weight percent acrylic acid units, at least 20 weight percent methyl acrylate units and up to 45 weight percent 2-ethylhexyl acrylate units.

7. The blend according to claim 3 wherein the second polymer comprises from 16 to about 40 weight percent acrylic acid units and from 60 to 84 weight percent styrene units.

8. The blend according to claim 3 wherein the second polymer comprises from 16 to about 40 weight percent acrylic acid units, 20 to 83 weight percent styrene units and up to a total of 45 weight percent of one or more ethylenically unsaturated copolymerizable units selected from methyl acrylate, n-butyl acrylate and 2-ethylhexyl acrylate.

9. The blend according to claim 3 wherein the second polymer consisting essentially of from 10 to about 40 weight percent acrylic acid units and from 60 to 90 weight percent ethyl acrylate units.

10. The blend according to claim 3 wherein the second polymer consisting essentially of 5 to about 40 weight percent acrylic acid units, at least 20 weight percent ethyl acrylate units and up to a total of 45 weight percent of one or more ethylenically unsaturated copolymerizable units selected from methyl acrylate, n-butyl acrylate, 2-ethylhexyl acrylate and styrene.

11. A polymer emulsion or suspension comprising water; an emulsifier; and a stable blend of (a) a first polymer consisting essentially of at least 90 weight percent vinyl acetate units and (b) a second polymer consisting essentially of at least 10 weight percent acrylic acid units and from 5 to 90 weight percent of one or more ethylenically unsaturated copolymerizable units selected from styrene, methyl acrylate, ethyl acrylate or 2-ethylhexyl acrylate, with the proviso that said second polymer contain at least one copolymerizable unit selected from the group consisting of styrene, methyl acrylate, and ethyl acrylate, wherein the first and second polymers exhibits thermodynamic miscibility.

12. The polymer emulsion or suspension of claim 11 wherein the blend contains 10 to 90 weight percent of the first polymer and from 90 to 10 weight percent of the second polymer.

13. The polymer emulsion or suspension of claim 12 wherein the first polymer is poly(vinyl acetate).

14. The polymer emulsion or suspension of claim 13 wherein the second polymer consisting essentially of from 10 to about 30 weight percent acrylic acid units and from 70 to 90 weight percent methyl acrylate units.

15. The polymer emulsion or suspension of claim 13 wherein the second polymer consisting essentially of 5 to about 30 weight percent acrylic acid units, at least 20 weight percent methyl acrylate units and up to a total of 45 weight percent of one or more ethylenically unsaturated copolymerizable units selected from methyl acrylate, n-butyl acrylate, 2-ethylhexyl acrylate and styrene.

16. The polymer emulsion or suspension of claim 13 wherein the second polymer consisting essentially of 5 to about 30 weight percent acrylic acid units, at least 20 weight percent methyl acrylate units and up to 45 weight percent 2-ethylhexyl acrylate units.

17. The polymer emulsion or suspension of claim 13 wherein the second polymer comprises from 16 to about 40 weight percent acrylic acid units and from 60 to 84 weight percent styrene units.

18. The polymer emulsion or suspension of claim 13 wherein the second polymer comprises from 16 to about 40 weight percent acrylic acid units, 20 to 83 weight percent styrene units and up to a total of 45 weight percent of one or more ethylenically unsaturated copolymerizable units selected from methyl acrylate, ethyl acrylate, n-butyl acrylate and 2-ethylhexyl acrylate.

19. The polymer emulsion or suspension of claim 13 wherein the second polymer consisting essentially of from 10 to about 40 weight percent acrylic acid units and from 60 to 90 weight percent ethyl acrylate units.

20. The polymer emulsion or suspension of claim 13 wherein the second polymer consisting essentially of 5 to about 40 weight percent acrylic acid units, at least 20 weight percent ethyl acrylate units and up to a total of 45 weight percent of one or more ethylenically unsaturated copolymerizable units selected from methyl acrylate, n-butyl acrylate, 2-ethylhexyl acrylate and styrene.

* * * * *